United States Patent
Hattingh

(10) Patent No.: US 12,019,537 B2
(45) Date of Patent: *Jun. 25, 2024

(54) FEATURE-BASED DEPLOYMENT PIPELINES

(71) Applicant: Capital One Services, LLC, McLean, VA (US)

(72) Inventor: Willem Hattingh, Purcellville, VA (US)

(73) Assignee: Capital One Services, LLC, McLean, VA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/681,392

(22) Filed: Feb. 25, 2022

(65) Prior Publication Data

US 2022/0245062 A1 Aug. 4, 2022

Related U.S. Application Data

(63) Continuation of application No. 16/789,218, filed on Feb. 12, 2020, now Pat. No. 11,263,120.

(51) Int. Cl.
*G06F 11/36* (2006.01)
*G06F 8/60* (2018.01)

(52) U.S. Cl.
CPC ............ *G06F 11/3688* (2013.01); *G06F 8/60* (2013.01); *G06F 11/3664* (2013.01)

(58) Field of Classification Search
CPC ..... G06F 8/60; G06F 11/3664; G06F 11/3688
See application file for complete search history.

(56) References Cited

U.S. PATENT DOCUMENTS 9,032,373 B1 * 5/2015 Gupta ................ G06F 11/3688
717/127
11,261,120 B2 * 3/2022 Balduin ................ C03B 35/147
(Continued)

FOREIGN PATENT DOCUMENTS

CN 108829399 A * 11/2018 .......... G06F 11/3688
CN 108874650 A * 11/2018
(Continued)

OTHER PUBLICATIONS

Piuhola, "Automation of container-based software build pipelines", 2017, Metropolia University of Applied Sciences (Year: 2017).*
(Continued)

*Primary Examiner* — Wei Y Zhen
*Assistant Examiner* — Junchun Wu
(74) *Attorney, Agent, or Firm* — KDW FIRM PLLC

(57) ABSTRACT

Techniques for feature-based deployment pipelines are disclosed. The feature-based deployment pipelines use a service file as well as other manifest files to set up a repository, a continuous integration service to initiate testing, and a container orchestration system to build images and establish version control over the system. The feature-based deployment pipelines invoke sequential stages to enable feature branches of an application to be fully tested before proceeding to a succeeding stage. At each stage, relevant stakeholders are able to evaluate the new features before they become part of the master image of the tested application. A variety of validation and performance tests are conducted at each stage, resulting in a fully vetted application available for a consumer.

20 Claims, 10 Drawing Sheets

(56) References Cited

U.S. PATENT DOCUMENTS

| | | | | |
|---|---|---|---|---|
| 2009/0222806 | A1* | 9/2009 | Faus | G06F 8/63 |
| | | | | 717/168 |
| 2012/0317562 | A1* | 12/2012 | Wang | G06F 8/65 |
| | | | | 717/170 |
| 2013/0132943 | A1* | 5/2013 | Karayi | G06F 8/60 |
| | | | | 709/217 |
| 2015/0286558 | A1* | 10/2015 | Bartlow | G06F 8/71 |
| | | | | 717/131 |
| 2016/0378647 | A1* | 12/2016 | Maeoka | G06F 11/36 |
| | | | | 717/124 |
| 2017/0220404 | A1* | 8/2017 | Polar Seminario | |
| | | | | G06F 11/0751 |
| 2017/0372247 | A1* | 12/2017 | Tauber | G06F 8/71 |
| 2019/0146772 | A1* | 5/2019 | Griffin | G06F 8/71 |
| | | | | 717/121 |
| 2019/0306045 | A1* | 10/2019 | Avdesh Khanna | H04L 67/10 |
| 2020/0019411 | A1* | 1/2020 | Nadella | G06F 8/71 |
| 2020/0310775 | A1* | 10/2020 | Nyamars | G06F 8/60 |
| 2020/0358846 | A1* | 11/2020 | Bonas | H04L 67/1001 |
| 2021/0064351 | A1* | 3/2021 | Naganuma | G06F 8/63 |
| 2021/0141636 | A1* | 5/2021 | Babol | G06F 8/60 |
| 2022/0245062 | A1* | 8/2022 | Hattingh | G06F 9/45558 |

FOREIGN PATENT DOCUMENTS

| | | | | |
|---|---|---|---|---|
| CN | 111142879 A | * | 5/2020 | G06F 11/1464 |
| WO | WO-2019113216 A1 | * | 6/2019 | G06F 3/0482 |

OTHER PUBLICATIONS

Mironov, "DevOps Pipeline with Docker", 2018, Helsinki Metropolia University of Applied Sciences (Year: 2018).*

Jenness et al., "LSST Data Management Software Development Practices and Tools", 2018, SPIE (Year: 2018).*

Adams et al., "Modern Release Engineering in a Nutshell", 2016, IEEE (Year: 2016).*

Kurpick et al., "Naming in deployment pipelines for SaaS", 2017, 2nd Workshop on Continuous Software Engineering (Year: 2017).*

* cited by examiner

FEATURE-BASED DEPLOYMENT PIPELINES

CROSS-REFERENCE TO RELATED APPLICATIONS

This application is a continuation of U.S. patent application Ser. No. 16/789,218, entitled "FEATURE-BASED DEPLOYMENT PIPELINES" filed on Feb. 12, 2020. The contents of the aforementioned application are incorporated herein by reference in their entirety.

BACKGROUND

When developing software, the process that binds the application development teams may be inefficient. The binding process ensures that there are proper safeguards for software quality and application security prior to releasing these items into production. Despite its noble intentions, such binding of the different development teams may cause multiple runs that slows down the product development. Application teams and process teams, for example, may have conflicting requirements, causing overall development to halt, at least for short durations.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for

Further, an embodiment is directed to an apparatus comprising a processor and memory coupled to the processor, the memory comprising instructions that, when executed by the processor, cause the processor to launch a project repository for testing an application program, the project repository comprising a plurality of manifest files, each manifest file to be associated with a respective program/tool, wherein the application program is created based on a plurality of feature branches, test a feature branch of the plurality of feature branches, store a binary image of the feature branch in a development container repository, wherein the storing triggers a container orchestration system to build a first domain name server (DNS) endpoint for storing the feature branch, the container orchestration system to utilize a manifest file of the project repository, and merge the feature branch into a master branch once testing of the feature branch is complete.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

Note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

Figure 1:
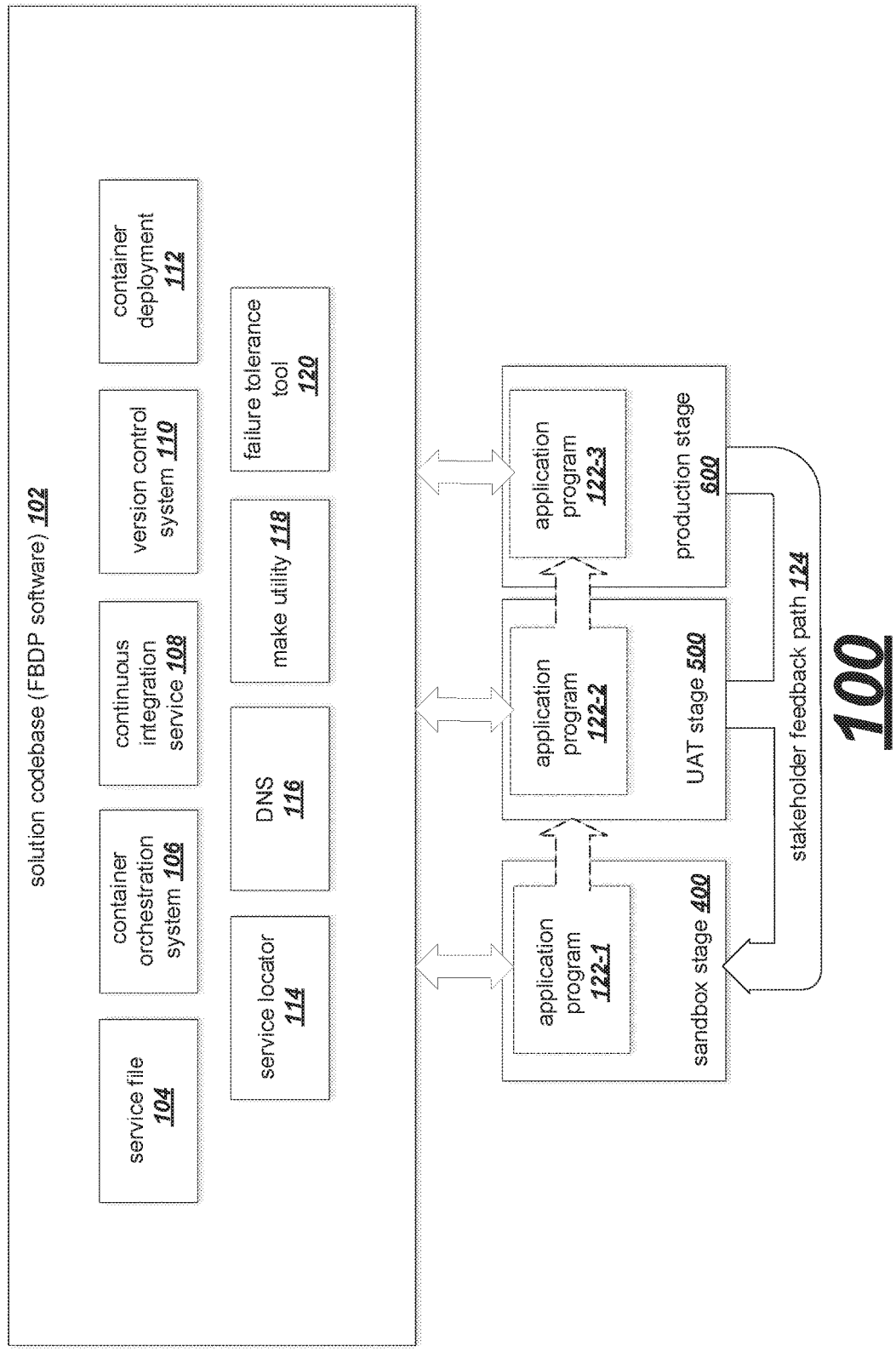

FIG. 1 illustrates an embodiment of a system for feature-based deployment pipelines.

Figure 2:
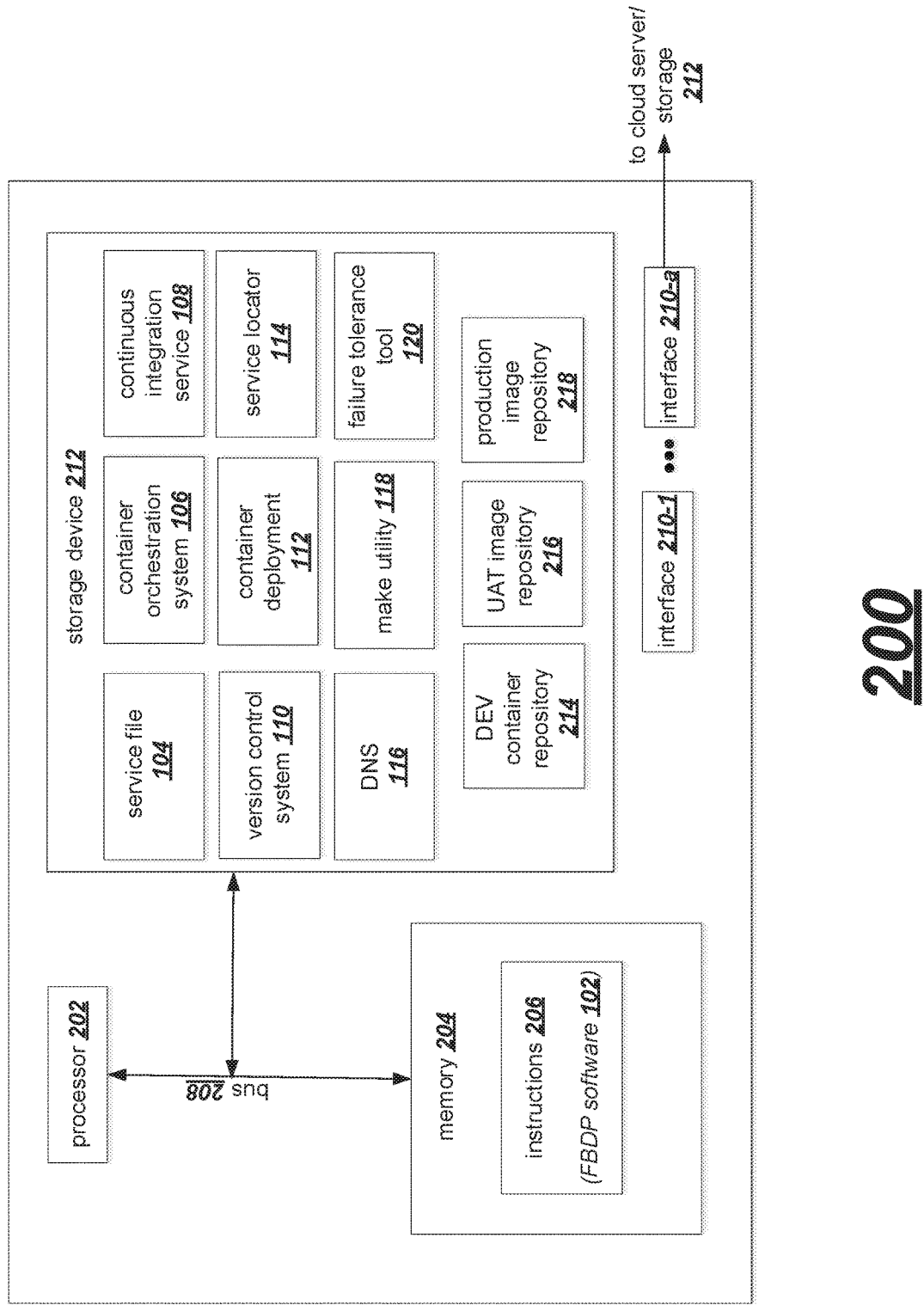

FIG. 2 illustrates an embodiment of an apparatus to implement the system of FIG. 1.

Figure 3:
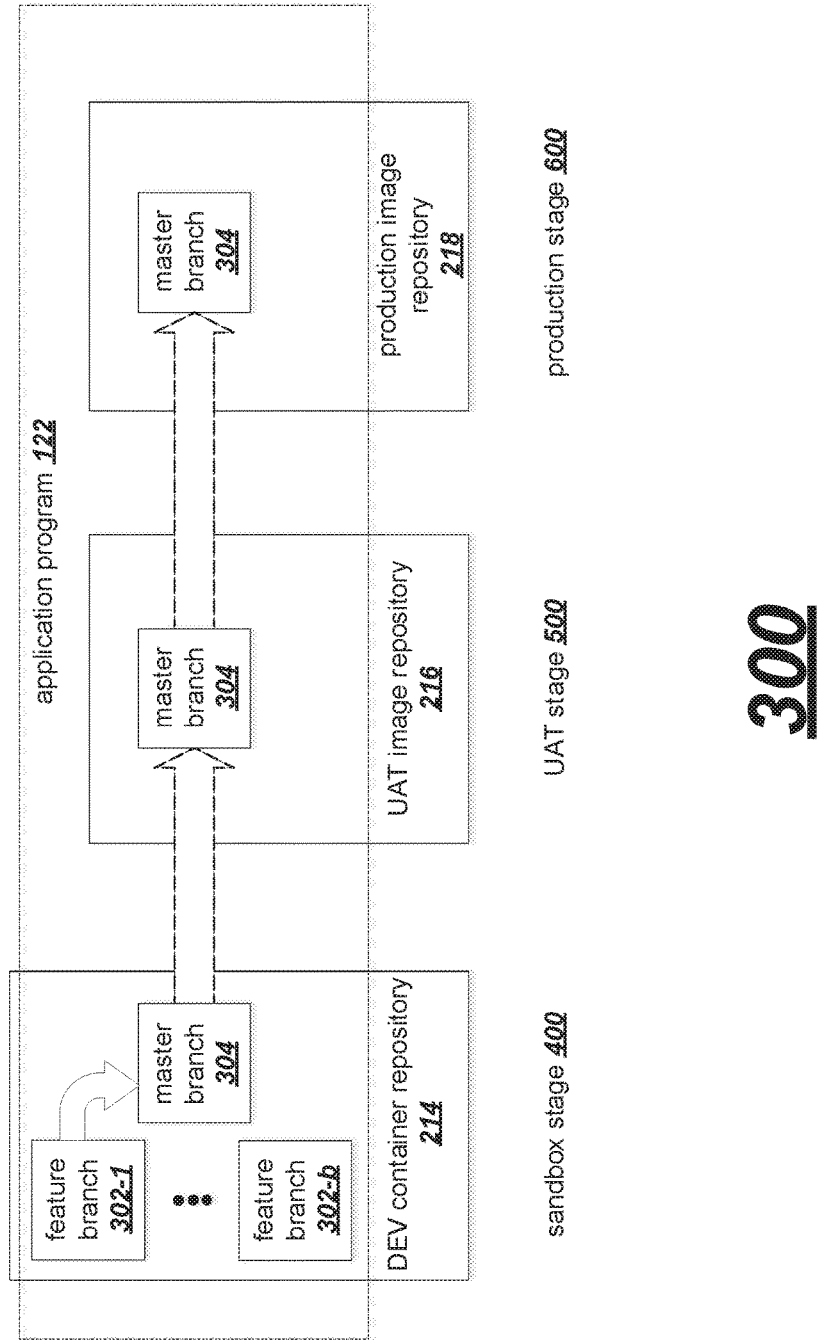

FIG. 3 illustrates an embodiment of a method for feature-based deployment pipelines.

Figure 4:
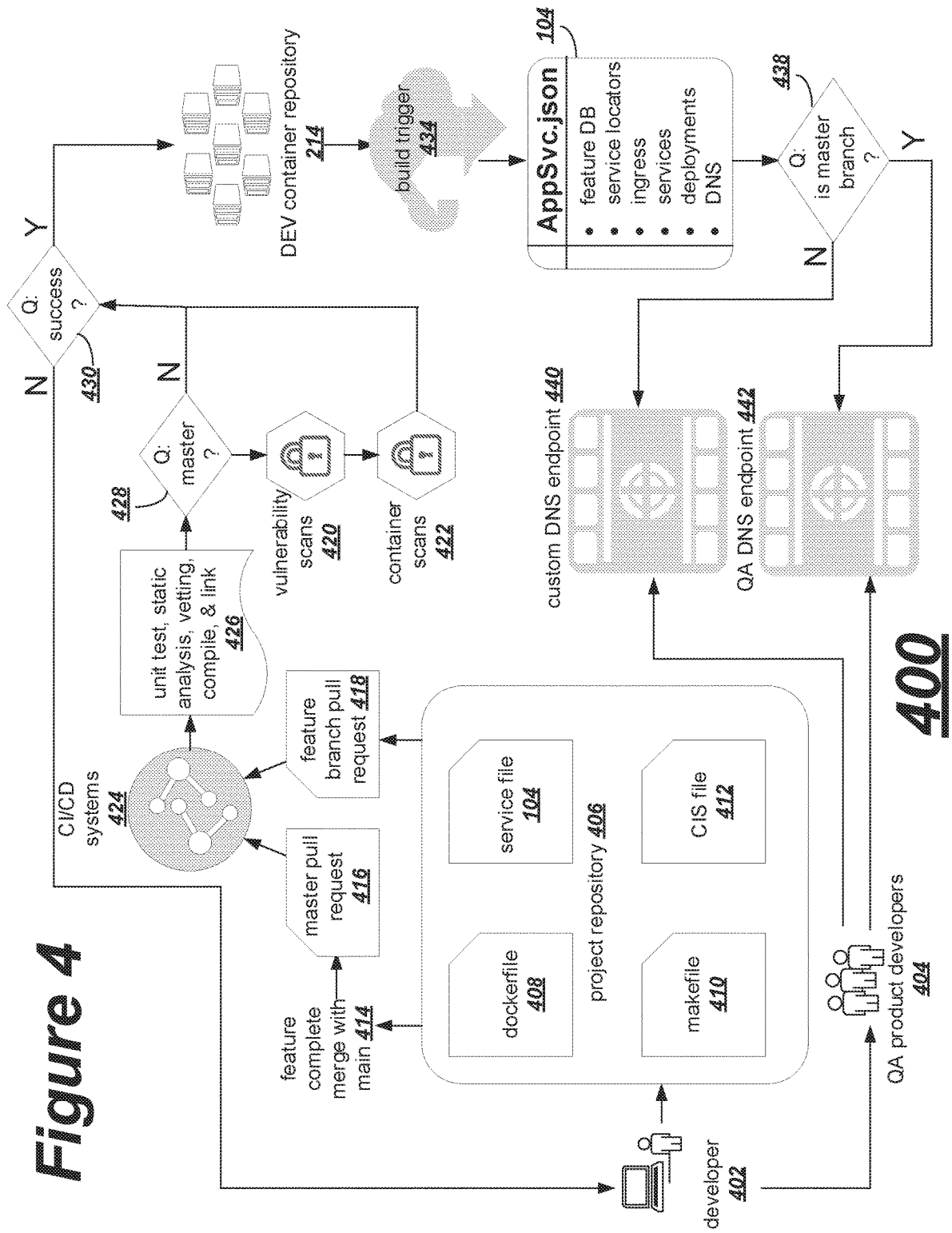

FIG. 4 illustrates an embodiment of initial stages of a feature-based deployment pipeline.

Figure 5:
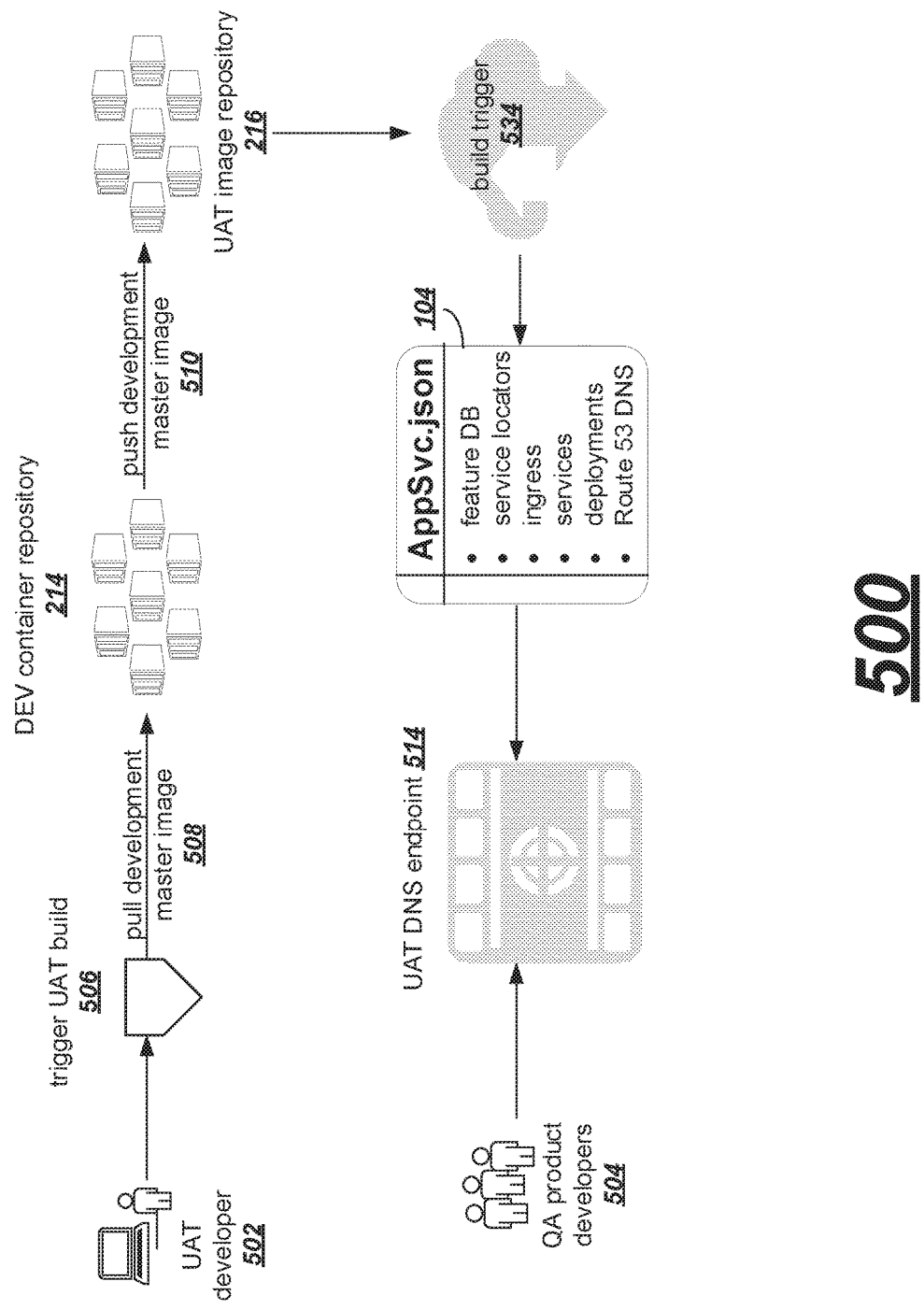

FIG. 5 illustrates an embodiment of an intermediate stage of a feature-based deployment pipeline.

Figure 6:
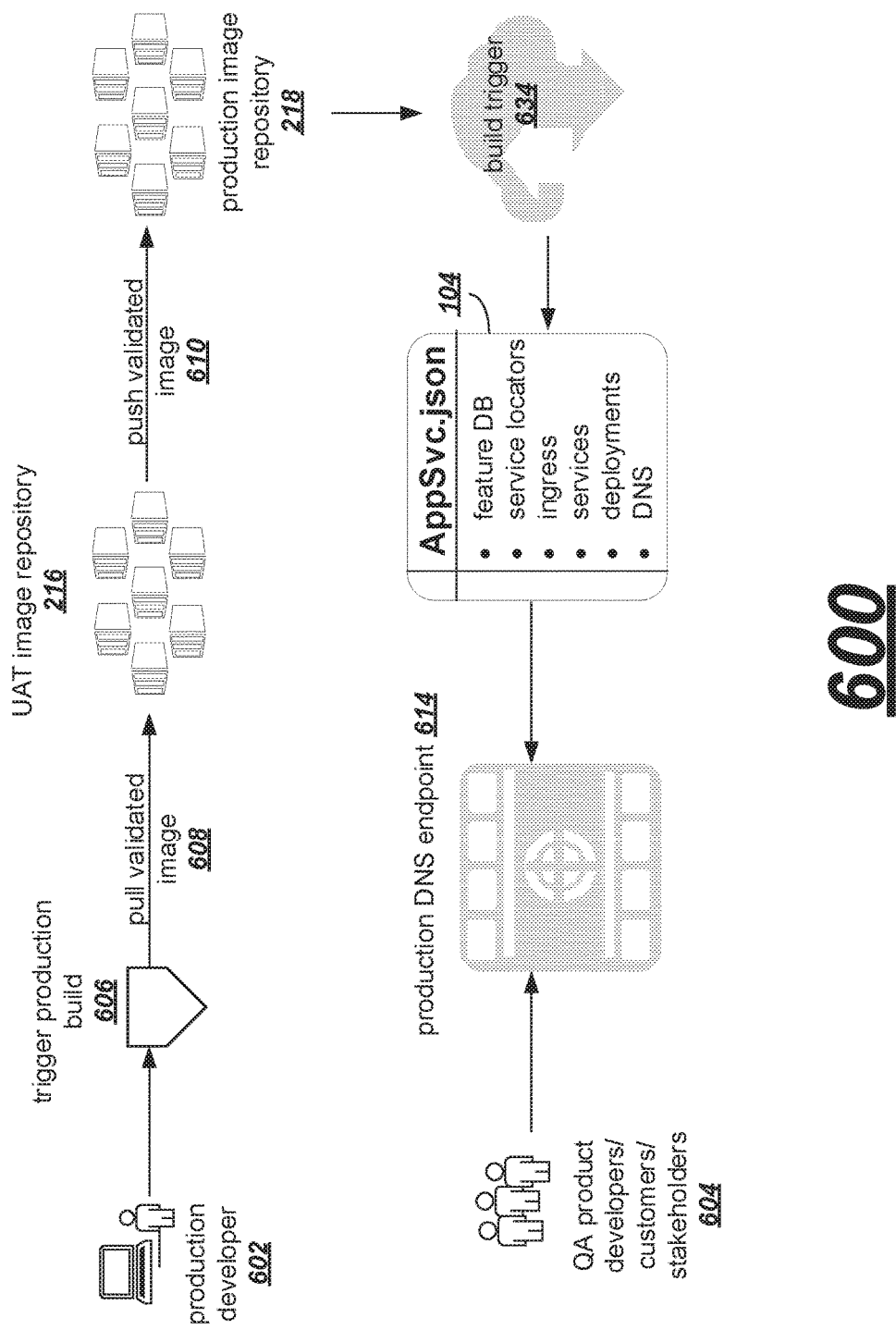

FIG. 6 illustrates an embodiment of a final stage of a feature-based deployment pipeline.

Figure 7:
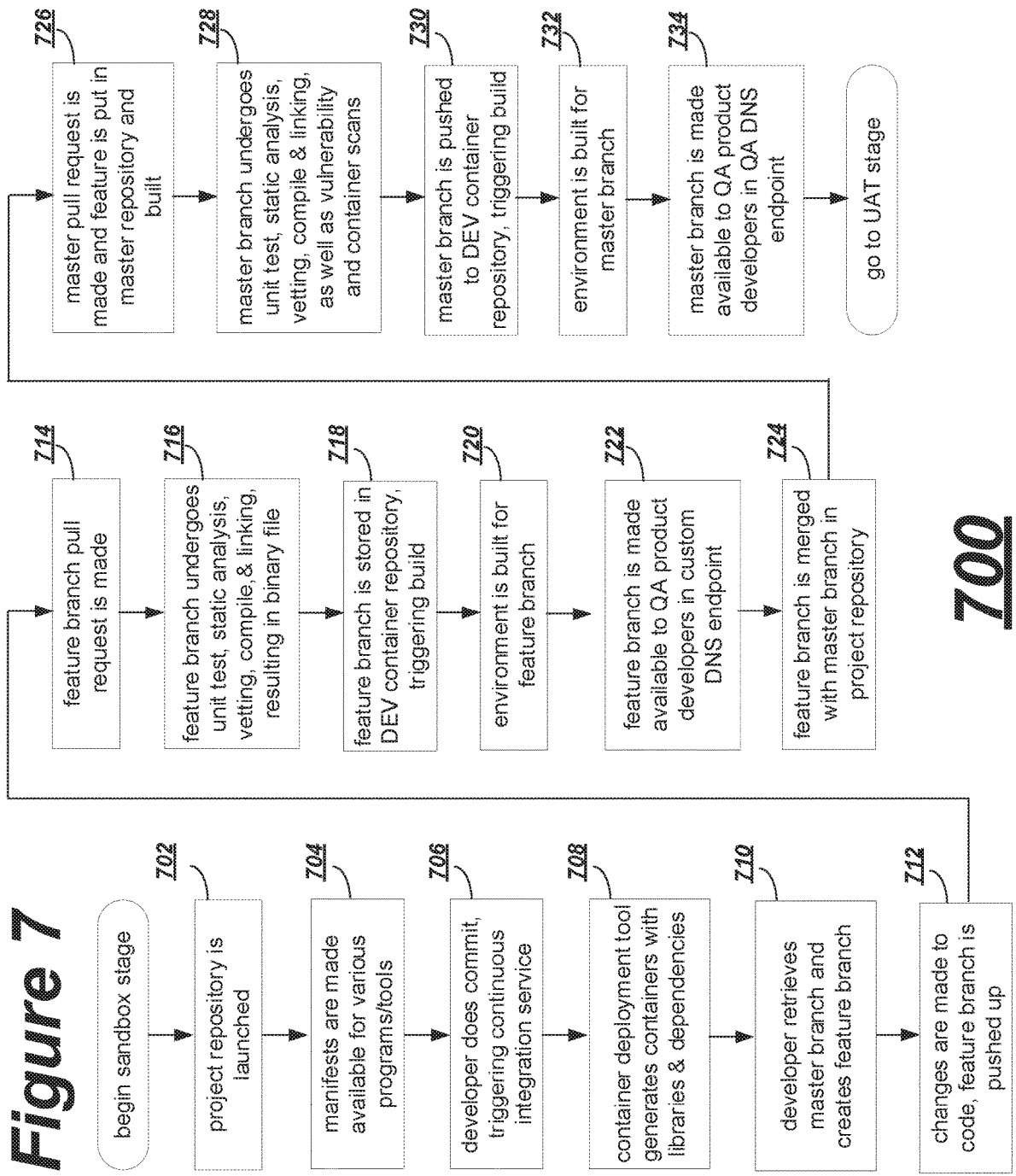

FIG. 7 is a flow diagram illustrating the sandbox stage of the feature-based deployment pipeline of FIG. 1.

Figure 8:
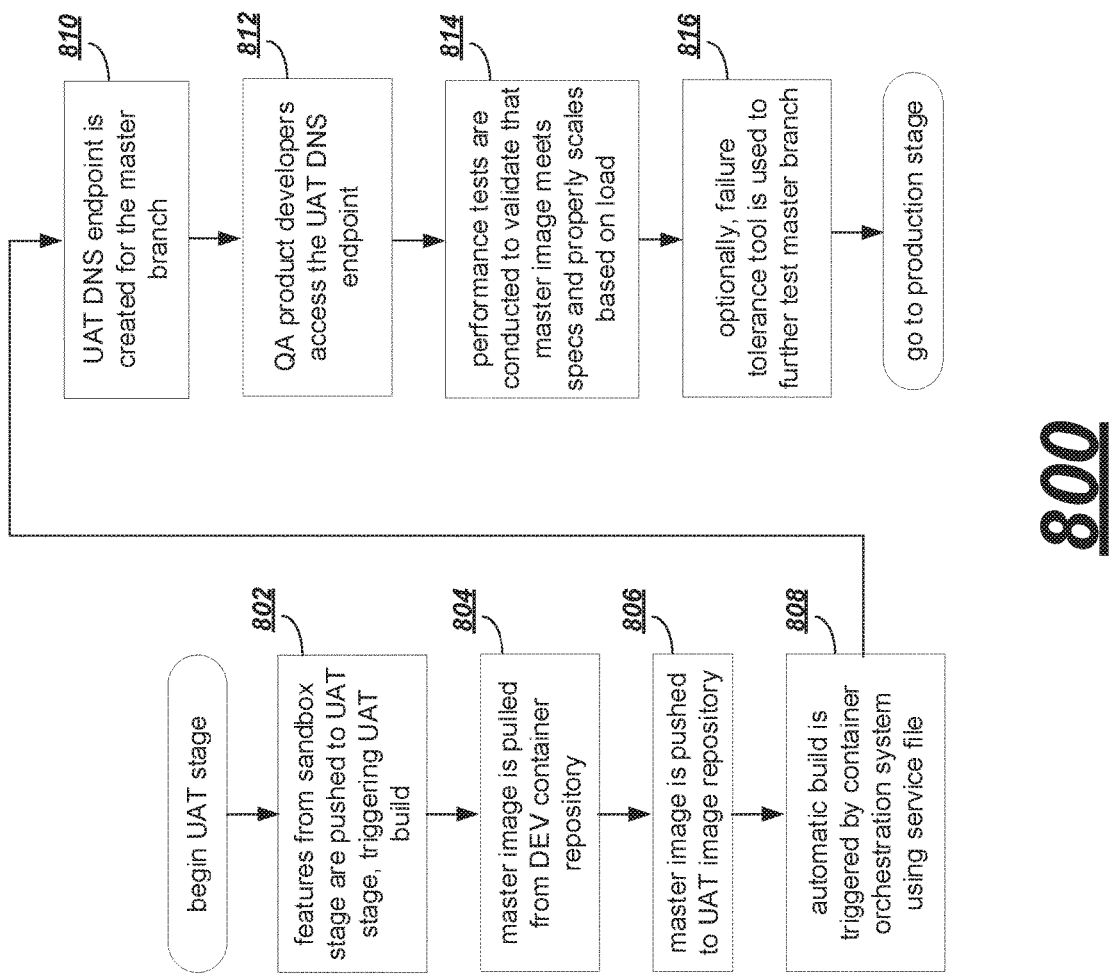

FIG. 8 is a flow diagram illustrating the User Acceptance Testing stage of the feature-based deployment pipeline of FIG. 1.

Figure 9:
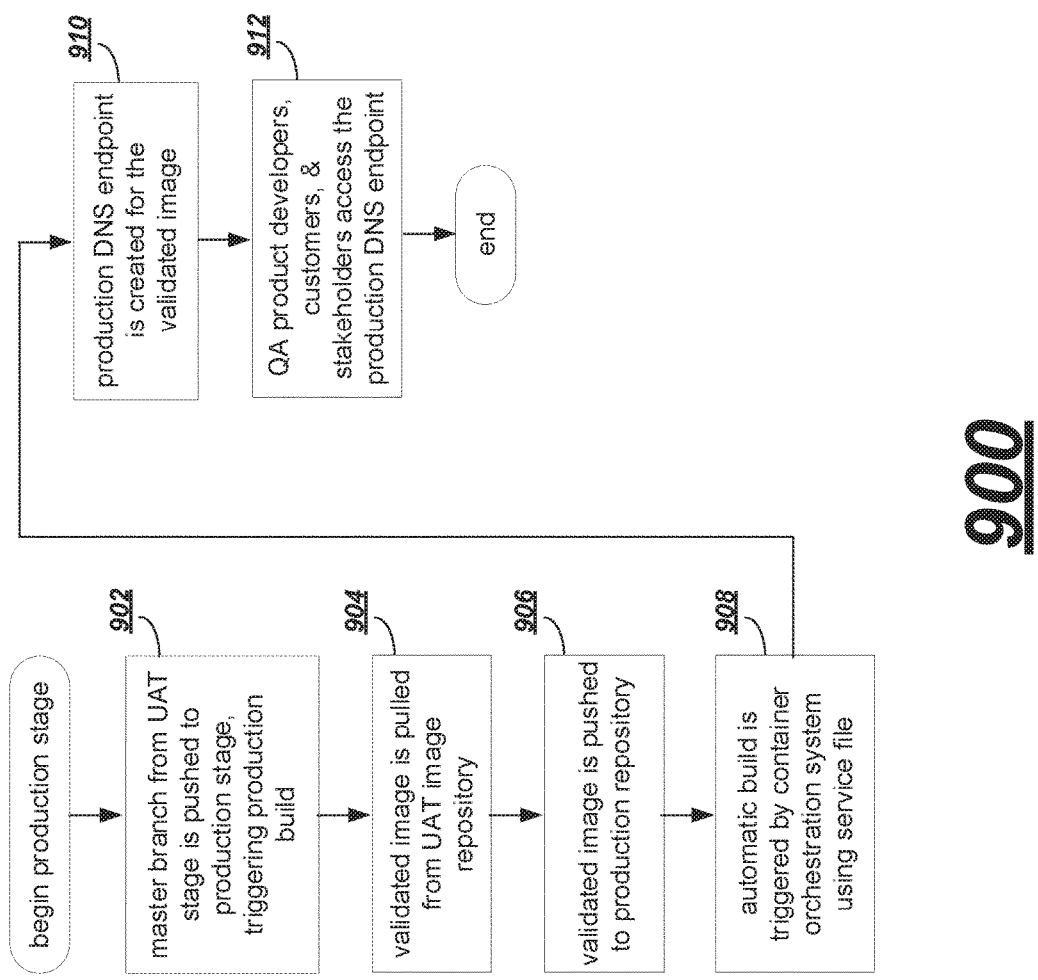

FIG. 9 is a flow diagram illustrating the production stage of the feature-based deployment pipeline of FIG. 1.

Figure 10:
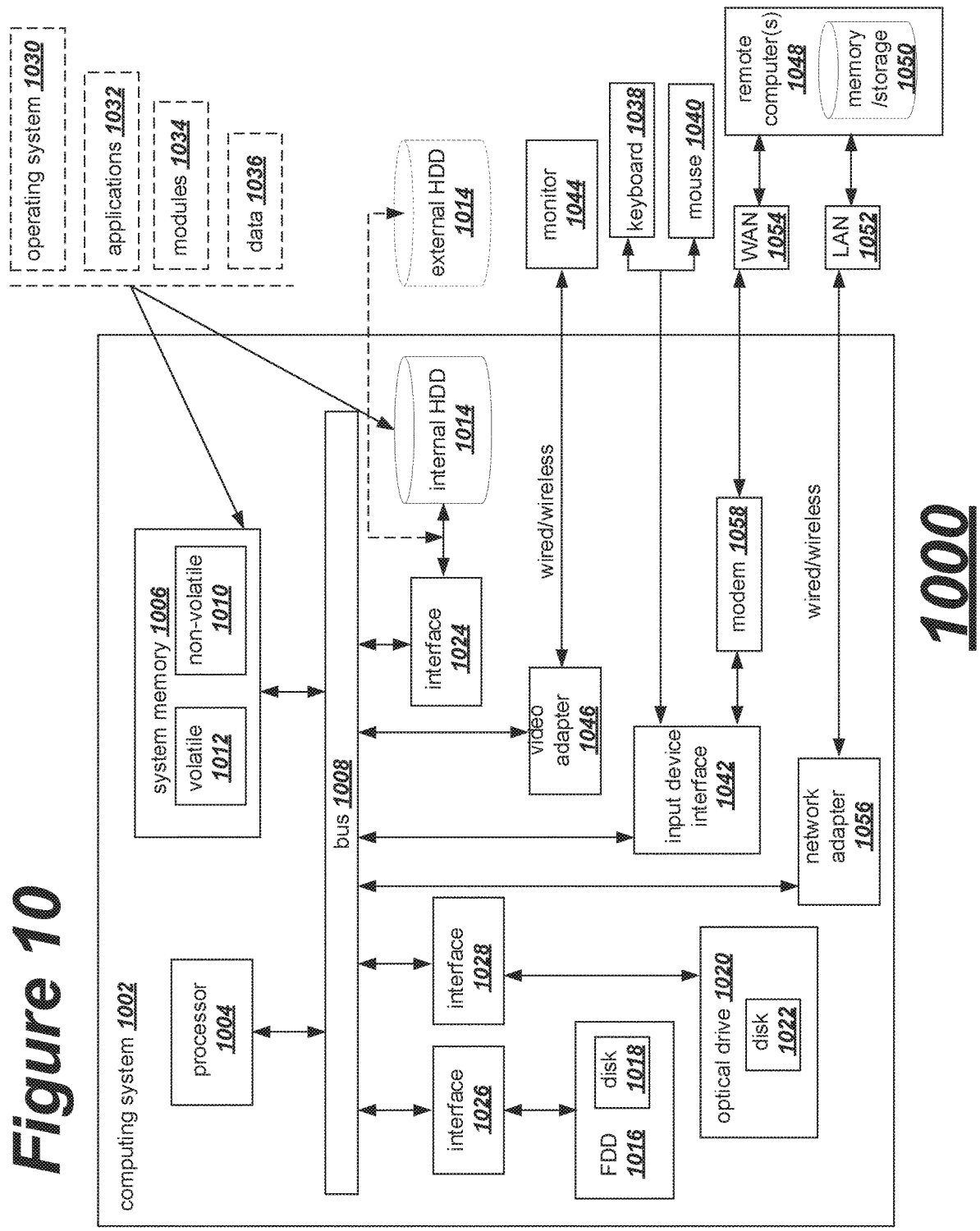

FIG. 10 illustrates an embodiment of a communications architecture.

DETAILED DESCRIPTION

Various embodiments are generally directed to techniques for feature-based deployment pipelines. The feature-based deployment pipelines illustrated herein use a service file as well as other setup files to set up a repository, a continuous integration service to initiate testing, and a container orchestration system to build images and establish version control over the system. The feature-based deployment pipelines invoke sequential stages to enable feature branches of an application to be fully tested before proceeding to a succeeding stage. At each stage, relevant stakeholders are able to evaluate the new features before they become part of the master image of the tested application. A variety of validation and performance tests are conducted at each stage, resulting in a fully vetted application available for a consumer.

By removing the constraints inherent in the process development cycle, application developers can focus on their development and refinement of products, while testing and quality teams are able to execute independently without being delayed by the development team. What was thus traditionally a linear approach to software development is replaced with one in which different entities in the process are able to operate independently.

With general reference to notations and nomenclature used herein, the detailed descriptions which follow may be presented in terms of program processes executed on a computer or network of computers. These process descriptions and representations are used by those skilled in the art to most effectively convey the substance of their work to others skilled in the art.

A process is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations.

FIG. 1 is a simplified block diagram of a system for feature-based deployment pipelines 100. The system for feature-based deployment pipelines, or FBDP system 100 for short, includes capabilities to enable software development based on continuous deployment, continuous integration, and continuous testing of a software program through its entire development life cycle. To this end, the FBDP system 100 is designed to implement a Continuous Integration/Continuous Delivery (CI/CD) pipeline and utilizes many open-source tools to achieve these goals. Software development based on such an approach is often referred to as DevOps.

The FBDP system 100 features an solution codebase 102, which may also be referred to herein as "feature-based deployment pipeline software 102" or "FDBP software 102" for convenience. The FDBP software 102 is a development environment that utilizes tools to enable developers to generate a program, known as the application program 122. The FDBP software 102 contains code, but also contains information that enables the FBDP system 100 to know how to deploy different elements of the system. The application program 122 may also be referred to as a product or a consumer product but is to be distinguished from the FDBP software 102 that is used to develop the application program 122. The application program 122 may be a web page, an app for a smartphone, or any of a variety of different software programs. The application program 122 may be offered for sale or given to the public or may be used as a proprietary application within an organization.

The FDBP software 102 is involved in creating a development environment, the feature-based deployment pipeline, as well as the movement of the application program 122 through several stages of development. These stages include a sandbox stage 400, a User Acceptance Testing (UAT) stage 500, and a production stage 600, at which point the application program 122 is available for its intended use. Each of the stages are described in more detail in FIGS. 4-9, below.

Along these stages, which are part of a pipeline, the various software pieces of the application program 122 may undergo version control, build, unit and integration testing, deployment, measurement, and validation. These and other aspects of the FBDP system 100 are described in more detail below.

The solution codebase 102 of the FBDP system features programs/tools that assist in testing the application program 122. These programs/tools include a service file 104, a container orchestration system 106, a continuous integration service 108, a version control system 110, container deployment 112, a service locator 114, a Domain Name Service (DNS) 116, a make utility 118, and a failure tolerance tool 120, which are described further herein.

The service file 104 provides connection and resource information for development of the application program 122. In particular, the service file 104 sets up a repository, as illustrated in FIG. 4. In some embodiments, the service file 104 is a single file containing variables that would indicate different environment variables. The service file 104 may thus be used for all run environments, ensuring that there is a matching infrastructure between the different environments. The service file 104 may be implemented as a JavaScript Object Notation (json) file, which is a lightweight data interchange format that is language-independent. As another example, the service file 104 may be implemented as a YAML Yet Another Markup Language (yaml) file, which is a human-readable data serialization language, commonly used for configuration files and in applications where data is being stored or transmitted. Like json, yaml can be used with many different programming languages. As a specific example, service file 104 may be embodied as AppSvc.json, AppSvc.yml, or the like. In the FDBP system 100, the service file 104, whether implemented with json or yaml, provides connection and resource points needed by the FDBP software 102. Each application program 122 being implemented using the FDBP system 100 would have an associated and unique service file 104.

Further, the service file 104 (such as AppSvc.json) provides other benefits to the FBDP system 100, including but not limited to the following:

Automatic monitoring of endpoints & reduced over-monitoring

Automatic maintenance notifications for developers consuming a particular service or Application Programming Interface (API)

Self-learning for new developers on a platform to understand connectivity needs

Standardization in input/output methods across all teams

Way to allocate unused services and effectively sunset old applications

Understanding in knowing which services actually use a built API

Custom feature branches built for each dependent service

Automated DNS endpoint creations by environment

Automatic Firewall hole closures based on removed functionality

Easily translatable structure that does not bind to a particular kind of CI/CD

The solution codebase 102 of the FBDP system also features a container orchestration system 106, such as Kubernetes™. Kubernetes™ is an open-source container-orchestration system for automating application deployment, scaling, and management. Kubernetes™ defines a set of building blocks ("primitives") which collectively provide mechanisms that deploy, maintain, and scale applications based on CPU, memory, or custom metrics.

In addition to the service file 104 and the container orchestration system 106, the solution codebase 102 employs several other tools to facilitate DevOps generally and CI/CD specifically in the FBDP system 100. The continuous integration service 108, such as Jenkins™, Travis™, or GitLabs™ CI/CD, is used by the solution codebase 102 to automate tasks related to building, testing, and deploying the application program 122. Jenkins™ is a self-contained, open-source automation server that can be installed through native system packages, such as Docker™, or may be run standalone by any machine with Java Runtime Environment™ and features a pipeline. Travis™ is a hosted continuous integration service, some of which is open source, and is used to build and test software projects hosted by GitHub™. Other programs besides Jenkins™ or Travis™, such as GitLabs™ CI/CD, may be used by the solution codebase 102 to provide continuous integration services for the FBDP system 100.

Another tool used by the solution codebase 102 includes a version control system 110, such as Git™. Git™ is an open-source distributed version control system. Rather than having a single location for the full version history of the application program 122, using the version control system 110, every developer's working copy of the application program code is also a repository that can contain the full history of all changes. A version control system 110 such as Git™ thus tracks changes made to files during development of the application program 122.

The solution codebase 102 also utilizes a container deployment system 112, such as Docker™. Docker™ is a tool designed to make it easier to create, deploy, and run applications by using containers. Containers allow the developers to package up an application with the parts needed by the application, such as libraries and dependencies, and send the application out as a single package. Docker™ works well with Jenkins™ and its containers may be deployed in a cloud. For CI/CD, Docker™ enables the establishment of local development environments that are like a live server, run multiple development environments from the same host with unique software, operating systems, and configurations, test projects on new or different servers, and allow anyone to work on the same project with the same settings, regardless of the local host environment. The container deployment system 114 thus enables developers to run the test suites to quickly see if a newly made change to the application program 122 works properly.

Further, the solution codebase 102 may utilize a service locator 114, or service location pattern, which is used to encapsulate the processes involved in obtaining a service with a strong abstraction layer. The pattern uses a central registry known as the "service locator" which, on request, returns the information necessary to perform a certain task. The solution codebase 102 may also utilize a DNS 116, such as Route 53™ DNS, or the like. Route 53™ DNS is a Domain Name Service (DNS) run by Amazon™. Route 53 DNS is part of Amazon's cloud computing platform, Amazon Web Services™ (AWS). Route 53™ enables routing to AWS services and non-AWS infrastructure, and to monitor the health of their application and its endpoints.

Further, the solution codebase 102 may utilize a make utility 118, which is a tool that automatically determines which source files of a program need to be recompiled and or linked. The make utility 118 is particularly helpful when the program consists of many component files, as is the case with the solution codebase 102. Finally, the solution codebase 102 may optionally utilize a failure tolerance tools 120, such as Chaos Monkey™. Chaos Monkey™ is a tool created by Netflix™ (part of their "Simian Army™") that checks failures. Chaos Monkey™ is a script that causes chaos by randomly shutting down server instances.

The three stages of the application program 122 shown in the FBDP system 100, the sandbox stage 400, the UAT stage 500, and the production stage 600, may suggest a linear progression. However, the FBDP system 100 is implemented as a pipeline in which a feature of the application program 122 is built, then subjected to a variety of tests, including unit test, deployed, further tested, and so on. A stakeholder feedback path 124 connected between the stages ensures that the feature branch is not accepted as part of the application program 122 until thoroughly vetted by the various stakeholders who are therein invested.

The FBDP system 100 may be implemented using applications or services other than those described herein. Nevertheless, the FBDP system 100 provides integration steps and standards that allow a gateway and repeatable processes for fast efficient builds by abstracting tools and enabling rapid development.

FIG. 2 is a block diagram of an apparatus 200 for feature-based deployment pipelines (FBDP). The FBDP apparatus 200 consists of a processor 202 and memory 204 connected to one another by a bus 208. The processor 202 may be circuitry arranged to execute instructions. The processor 202 may be a commercial processor and may include multiple cores. The processor 202 and memory 204 may be based on any of a variety of types of processor and memory circuitry, respectively, numerous examples of which are provided in FIG. 10. In the memory 204 are stored instructions 206 which are executable by the processor 202. Instructions 206 may be the FDBP software 102 (FIG. 1) used to generate the application program 122.

Also coupled to the processor 202 via the bus 208 is a storage device 212. The storage device 212 may be based on any of a variety of types of storage circuitry, numerous examples of which are provided in FIG. 10. The tools introduced in FIG. 1 reside in the storage device 212, namely, the service file 104, container orchestration system 106, continuous integration service 108, version control system 110, container deployment 112, service locator 114, Domain Name Service (DNS) 116, make utility 118, and failure tolerance tool 120. Alternatively, these and other files used by the FDBP software 102 may be stored in off-premises storage, such as a cloud server/storage device 212.

The storage device 212 of the FBDP apparatus 200 may further include a development (DEV) container repository 214, a UAT image repository 216, and a production image repository 218. These repositories are part of the sandbox stage 400, UAT stage 500, and production stage 600, respectively, and are discussed in more detail in conjunction with FIGS. 3-9.

The FBDP apparatus 200 further includes a interfaces 210-1-210-a, for making connections external to the apparatus (collectively, "interfaces 210"). For example, the FBDP apparatus 200 may be coupled to cloud server/storage 212. These interfaces 210 may be wired for local connections or wireless for remote connections.

FIG. 3 is a simplified diagram of a method for feature-based deployment pipelines 300, or FBDP method 300 for short. The application program 122 (FIG. 1) is made up of b feature branches 302-1-302-b (collectively, "feature branch 302" or "feature branches 302") and a master branch 304. At the sandbox stage 300 and with the assistance of the solution codebase 102, developers generate the feature branches 302 based on a desired functionality of the application program 122. This functionality may be requested by stakeholders of the application program 122, such as businesses and customers.

A large number of feature branches 302 may be separately and independently generated for the application program 122 by the developers. The application program 122 may not include all feature branches, but only those that successfully become part of the master branch. Once a feature branch 302 has passed some level of testing in the sandbox stage 300, the feature branch is stored in the DEV container repository 214. At a given time, the DEV container repository 214 may store only a single master branch 304 but may simultaneously store many, many feature branches 302.

At some point, a decision is made to combine one or more of the feature branches 302 with the master branch 304, forming a new master branch. The new master branch undergoes rigorous testing in the sandbox stage 400, and, only once the master branch passes the tests, is sent to the UAT stage 500 for further review. A more detailed description of the sandbox stage 400 is illustrated and described in conjunction with FIG. 4, below.

Once the master branch 304 is sent to the UAT stage 500, the master branch 304 is pulled from the UAT image repository 216 and undergoes additional testing. At the UAT stage, the individual stakeholders performing the testing may change from those testing during the sandbox stage 400. In some embodiments, the individual stakeholders testing during the UAT stage 500 is an expanded list of people from those testing during the sandbox stage 400. At the UAT stage 500, some data protections may be implemented, such as tokenizing sensitive data known as personally identifiable information (P11), such as social security numbers, credit card numbers, and the like, so that the sensitive data cannot be viewed by the stakeholders.

Once the stakeholders determine that the master branch 304 is sufficiently vetted, the master branch 304 is sent to the production stage 600 for final review. If on the other hand, the master branch 304 is deemed insufficient or inadequate to the original specification of the application program 122, the master branch is returned to the sandbox stage 400. A more detailed description of the UAT stage 500 is illustrated and described in conjunction with FIG. 5, below.

Once at the production stage 600, the master branch 304 is subjected again to rigorous testing. Again, the individual stakeholders involved in the testing may change from the other two stages. Also, at the production stage 600, some data protections may be implemented, such as tokenizing sensitive data. A more detailed description of the production stage 600 is illustrated and described in conjunction with FIG. 6, below.

Thus, the application program 122, which may be a web page, a smartphone app, database software, and so on, is made up of the feature branches 302, some of which become part of a master branch 304 in the sandbox stage 400. Once sufficiently vetted, the master branch 304 is further reviewed by relevant stakeholders at the UAT and production stages 500 and 600, respectively.

FIGS. 4-6 are schematic diagrams used to illustrate the above stages of the FBDP system 100 and FBDP method 300. The sandbox stage 400, the UAT stage 500, and the production stage 600, are the pathways for development, testing, and deployment of the application program 122. The solution codebase 102 uses the tools, such as the service file 104 (e.g., AppSvc.json), container orchestration system 106 (e.g., Kubernetes™) continuous integration service 108 (e.g., Jenkins™), as well as the many additional tools described above, to enable the environment, including feature branches and endpoints, that will enable the application program 122 to be tested in accordance with DevOps and CI/CD principles.

FIG. 4 illustrates the sandbox stage 400 of the FBDP system 100, which is a starting point for program development for an organization having multiple developers. The sandbox stage 400 makes use of feature-based build environments, which provide the QA product developers with a rapid development environment which is only partially tested. The sandbox stage 400 enables developers to rapidly test their applications via interaction, unit tests, and static analysis, while still interacting with product stakeholders and other team members.

Though not shown in the sandbox stage 400, the application program 122 is made up of the feature branches 302, one or more of which may become part of the master branch 304 (FIG. 3). A developer 402 initiates the sandbox stage 400 by launching a project repository 406 (e.g., a Git Project™, or the like), which includes several files. Git Project™ is a Git™ command that creates a Git™ repository. The Git™ repository tracks all changes made to files on the project, building a history over time. The service file 104, such as AppSvc.json, has already been described, with the sandbox stage 400 being one of the environments in which it is used.

Other files used by the solution codebase 102 (FIG. 1) are manifests or lists for their respective programs. Dockerfile 408 is the manifest for the container deployment tool 112, such as Docker™; makefile 410 is the manifest for the make utility 118; CIS file 412 is the manifest for the continuous integration service 108, such as Jenkins™ or Travis™. Quality Assurance (QA) product developers 404 will test the feature branches 302 that are coded by the developer or developers 402.

The project repository 406 includes built-in hooks which trigger responses. For example, if something is stored in the repository, an automatic action takes place. Once the illustrated files are in the project repository 406, the developer 402 does a commit, which triggers the continuous integration service, which pulls the makefile. Working with the continuous integration service 108, the container deployment tool 112 generates containers with the necessary libraries and dependencies.

Once the environment is established, a stakeholder of the application program 122, such as a developer, a business owner, or a customer, reports an issue to be solved. This would trigger the creation of a feature or a bug fix request, a working unit that is expected to be completed for the application program 122. The developer 402 creates a new branch under the project repository 406, the feature branch 302, by retrieving the master branch from the DEV container repository 214 and making a duplicate copy. Changes are made in the code for that version of the feature branch and then the feature branch is pushed up, at which point a feature branch pull request 418 may be made.

Once the feature branch pull request 418 is made, the feature branch 302 goes into the CI/CD systems 424, which is created by the continuous integration service 108 (using the CIS file 412). At this point, basic building and testing of the feature branch are done, after which the feature branch goes through a unit test, static analysis, vetting, compile, and linking 426. The link is the final compilation of the feature branch 302 that produces a binary file. Since the feature branch is not the master (query 428), the feature branch is not subjected to the vulnerability scans 420 and the container scans 422. This is because the QA product developers 404 need to see quickly how the feature branch interacts with the different components making up the application program 122. In some embodiments an average full container scan might take 1-2 hours, while testing the feature branch may take a few minutes or less. By avoiding the vulnerability scans 420 and container scans 422 until after the feature branch is more fully proven, the QA product developers 404 are able to independently and timely test many more feature branches.

For some applications, the operations in block 426 are done automatically. Although the process may be long and arduous via multiple build steps, the process at the sandbox stage 400 does not hinder application developers. This is because the QA product developers 404 are able to perform a single pull from the relevant feature branch to the master branch, which will kick off the barrage of tests. The developers 404 are able to immediately return to work on the application program 122 in the relevant feature branch from where the pull originated, without reducing any momentum.

Once design of the feature branch is approved and functionality is agreed upon, some additional refinement may take place. This is also where the QA product developers 404 complete the final iteration of unit testing, static analysis, and security scanning. Once the feature branch is complete and merged with the main 414, a master pull request 416 is made. The master branch of the application program 122 is additionally subjected to vulnerability scans 420 and container scans 422, in addition to the tests that were performed on the feature branches. If these tests pass (query 430), the updated application program 122 (master branch) with the new feature is stored in the DEV container repository 214. Otherwise, control returns to the developer 402, where the merged feature may be reevaluated.

The DEV container repository 214 stores all feature branches 302 that have passed the automated tests 426, plus a single master branch 304, as there will always be but a single master branch. The DEV container repository 214 stores containers of each built application feature in its own operating system. Each feature branch 302 and the master branch 304 are thus analogous to a CD ROM, with everything needed to load the feature (master) branch being present, allowing an image of the feature branch or master branch to be run as an image.

The DEV container repository 214 is distinguishable from the project repository 406 (e.g., Git™) in that it only stores container images, but they are each versioned. So, a developer may build on top of prior versions or may use a specific container version as a base image for some other application. Before being stored in the DEV container repository 214, a new container is created each time.

Once the feature branch 302 is stored in the DEV container repository 214, a build trigger 434 is automatically invoked. The storage of the feature branch in the DEV container repository 214 is another hook, which will automatically trigger the build trigger 434. The build trigger 434, which may be a Kubernetes™ build trigger, uses the AppSvc.json file 104, which is another manifest used to indicate to the CI/CD system what is needed. For example, some application programs would utilize a web server while other application programs would utilize a file storage location to push items to, a third application program would utilize a database. The AppSvc.json file 104 provides the information needed by the build trigger 434. Below the AppSvc.json file 104, there are several elements listed, namely, feature database (DB), service locators, ingress, services, deployments, and Domain Name Server (DNS). For a given application program, one or more of these elements may be used to build the environment for the feature branch (or master branch).

For the feature branches 302, a custom DNS endpoint 440 is created. The custom DNS endpoint 440 is a dynamic location on the web for storing the feature branch. The custom DNS endpoint 440 would not be available to end users or business owners who requested the application program 122. Instead, the custom DNS endpoint 440 is available to a limited set of developers, the QA product developers 404, as the location on which the feature branch 302 has been deployed.

Once the QA product developers 404 decide that the feature branch 302 is working well, the next step is to merge the feature branch to the master branch 304. Alternatively, the feature branch 302, along with other feature branches, may be merged with the master branch 304. As another alternative, the decision to merge feature branches with the master branch may be made periodically, such as once a week or twice a day.

The master branch is a production-ready branch that should be shippable to customers. The merging of the tested feature branch to the master branch is done by the project repository 406, such as Git Project™. A master pull request 416 is made, in which the feature is put in the master repository and built from there. Following unit test, static analysis, vetting, compile, and linking 426, the vulnerability scans 420 and container scans 422 are performed on the master branch. Depending on the application program 122, the additional testing may take between 30 minutes and 2 hours, in some examples.

Once the master branch testing completes successfully (query 430), the master branch is pushed to the DEV container repository 214 and replaces the current master branch, since the DEV container repository has a single master branch at any time. The push of the master branch into the DEV container repository 214 automatically invokes the build trigger 434, which reads the service file (AppSvc.json). Then, because this is the master branch, it is loaded to the current production environment location for the sandbox stage 400, the QA DNS endpoint 442.

While any of the above operations are taking place, new feature branches may be created by the developer 402. The project repository 406 maintains version control over every feature coming into the sandbox stage 400. The developer 402 does not have to wait for other feature branches to be pulled into the master branch before working on another feature branch. Plus, if a feature branch was completed three months ago, a comparison to a current master branch may be made. The version control system, such as Git™, enables the developer 402 to access older versions with ease.

Once the master branch is merged in FIG. 4, the developer 402 will deploy the master branch to the User Acceptance Testing (UAT) stage 500 in FIG. 5. When going from a development environment to a test environment, there may actually be several stages of testing. There may be a performance test environment, in which a lot of load is put on the application program to see how it performs with production data, there may be regression testing, and so on. The sandbox stage 400 may additionally include container scanning and certification with signing.

FIG. 5 illustrates the UAT stage 500 of the FBDP system 100, also known as performance testing, application testing, or end user testing. The UAT stage 500 is the phase of software development in which the software is tested by the intended audience. One goal of the UAT stage 500 is to closely mirror production. In some cases, the only difference between the UAT stage and the production stage is that, at the production stage, personally identifiable information (PII), such as credit card numbers, social security numbers, and the like, is tokenized. So, while the credit card numbers are not stored in the production stage 600, a test may be made to ensure that the application program 122 works with sixteen digit data, as one example.

In some embodiments, the UAT stage 500 is a manual step in which the developer 402 decides, periodically, to take all the features and push them to the UAT stage 500. This may be done at the end of the week, for example. The UAT DNS endpoint 514 will be similar to the QA DNS endpoint 442, except that data may be tokenized so that confidential details are not visible to the QA product developers 404.

Once the UAT developer 502 triggers the UAT build 506, the development master image (from the sandbox stage 500) is pulled 508 from the DEV container repository 214 and pushed 510 to the UAT image repository 216. This automatically triggers a build trigger 534, such as a Kubernetes™ build trigger, which uses the AppSvc.json file 104. The build trigger 534 is an application that is built to use the AppSvc.json file 104 and translate the information into services endpoints and deployments relating to the applications' branch name containers and dependencies. In the UAT stage 500 of the FBDP system 100, the build trigger 534 generates a UAT DNS endpoint 514 for the master branch.

The UAT DNS endpoint 514 is a different web location from the QA DNS endpoint 442 (FIG. 4), such that access to each is controlled. QA product developers 404 have access to the QA DNS endpoint 442 while QA product developers 504 (which may be a different group of people) have access to the UAT DNS endpoint 514.

The test repository that has been verified immutable is now pushed to the secure UAT image repository 216. Once the push is completed, the UAT environment is built/updated with the latest image and the changes may be verified against the UAT, which closely mimics production. The UAT stage 500 is thus the final validation phase. Optionally, the failure tolerance tool 120 (FIG. 1), such as Chaos Monkey™, may be used for additional testing. Chaos Monkey™ is a script that causes chaos by randomly shutting down server instances. Once full validation and performance testing is complete, the application program 122 may be pushed to the production image repository 218 (FIG. 6), to be built/updated on the production Kubernetes™ cluster.

Looking at the operations of FIG. 5 closely, when the UAT developer 502 triggers the UAT build 506, the development master image is pulled 508, validated, and pushed 510 to the UAT image repository 216. At the UAT stage 500, the images are being promoted and items are no longer being built. Therefore, it may be inferred that the tests would have exactly the same outcome, making the application program 122 a duplicate of what was previously fully tested. Therefore, no additional testing is performed at the UAT stage 500. Further, the UAT image repository 512 is fully locked down, with no access being available to regular developers. This prevents tampering and accidental modification of the development master image.

Once the deployment succeeds for the UAT stage 500, a final evaluation of the application program 122 occurs, by matching the different environments to that of production. If the application program 122 does not work in the sandbox stage 400, it will not work in the UAT stage 500, and, therefore, will not work in the production stage 600. The gating and promoting phases of the FBDP system 100 are designed to prevent challenging issues from occurring and may be described as a one-way directional deployment without a possibility of pushing the application directly to production. During the UAT stage 500, additional performance tests may be executed to validate that the application program 122 is meeting the desired specifications and also properly scales in and out based on load.

Once the application program 122 has been validated, control proceeds to FIG. 6, the production stage 600 of the FBDP system 100. At the production stage 600, the application program 122 is tested with actual data, prior to deployment to end customers. The production stage 600 follows a path similar to what occurred in the UAT stage 500 in promoting the UAT image of the application program 122 to the production image repository 218.

A production developer 602, which may be a different person from the UAT developer 502, triggers the production build 606. The validated production image (of the master branch) is pulled from the UAT image repository 216 and pushed to the production image repository 218. Again, a build trigger 634 is automatically invoked, again using an AppSvc.json file 104. The production image is then pushed to the production DNS endpoint 614 where it can be tested by the QA product developers, customer, and other stakeholders 604. Once pushed and validated, the production build is updated and the application program 122 is live and ready for customer use.

In each stage, the stakeholders may be different. So, in the sandbox stage 400, the developer 402 and the QA product developers 404 may be the product team for the application program, while in the production stage 600, the developer 602 and QA product developers 604 are more likely the customers of the application program.

By using input files and standardized methods to build applications such as the application program 122, the simplified process may be attached to every application built by the organization. The simplified process of the FBDP system 100 also provides direct insight into what the applications use and may intelligently report to the users when applications will be undergoing maintenance so there is no unneeded troubleshooting. The extended need for consumed services is to also build those environments in a feature-specific way for users to consume without impacting the main application endpoints.

In the FBDP system 100, the Kubernetes™ images are built with Git™ hash as the image tag. The open-source version control system of Git™ works well with distributed architectures. Rather than having a single place for the full version history of the application program 122, every developer's working copy of the code is also a repository that can contain the full history of all changes. In some embodiments, hash values rather than human-readable version numbers are used.

The Git™ hash as the image tag allows Kubernetes to make proper use of blue/green and canari deployment patterns and easily provide the ability to fall back to a previous version if a downgrade is required. Blue/green deployment is a technique in which two identical production environments are run. At any time, only one of the environments is live, with the live environment serving all production traffic. The goal of blue/green deployment is to reduce downtime and risk. The image tag also serves as a direct pointer to the current commit that was done. The image tag facilitates finding the exact source of an issue and the commit from which the issue started.

The FBDP system 100 makes use of features available within Kubernetes™ in order to successfully achieve the super agile CI/CD pipeline environment. CI/CD is a culture, set of operating principles, and practices that enable application development teams to deliver code changes more frequently and reliably. CI/CD is also known as the CI/CD pipeline.

The FBDP system 100 uses:
Docker repositories per environment, e.g., QA/UAT/production
Image based signing for validation of immutable and scanned images.
Image based tagging based on Git™ commit hash.
Metadata in Kubernetes™
An input process of files pushed via git commit for application interaction.
Service locators
Standardized DNS naming convention based on service and environment allocation.

FIGS. 7-9 are flow diagrams illustrating the various stages of the FBDP system 100 in greater detail. FIG. 7 illustrates process steps of the sandbox stage 400; FIG. 8 illustrates process steps of the UAT stage 500; and FIG. 9 illustrates process steps of the production stage 600.

In FIG. 7, as the setup stage 700 commences, the project repository is launched. Manifest files are added to the repository (block 702) and made available for their respective programs/tools, as described above (block 704). The service file 104 is used to build out the feature branch environment and additional service endpoint applications under the environment. The service files for the application including environment variables are also set to the specific endpoint locations. This provides an end-to-end testable environment for any developer working on a particular feature branch. The developer 402 does a commit, which triggers the continuous integration service, such as Jenkins™ or Travis™ (block 706). The container deployment tool 112 generates containers with the necessary libraries and dependencies (block 708).

In response to a request for a new feature or bug fix, the developer 402 retrieves the master branch from DEV container repository 214, makes a duplicate copy, and creates a feature branch (block 710). Changes are made to the code and feature branch is pushed up (block 712), enabling feature branch pull request to be made (block 714). The feature branch enters the CI/CD systems 424 of the continuous integration service 108 and building and testing of the feature branch are done and the feature branch goes through a unit test, static analysis, vetting, compile, and linking, resulting in a binary file (block 716). The feature branch binary file is stored in the DEV container repository 214, which automatically triggers the build (block 718).

The environment is built, using the service file 104 as its manifest for what is needed by the CI/CD system to test the feature branch (block 720). The feature branch is then made available in the custom DNS endpoint 440, where it will be tested by the QA product developers 404 (block 722).

A decision is made to merge the feature branch with the master branch in the project repository 406 (block 724). This may be done with other feature branches for example. A master pull request is made 416 and feature is put in master repository and built (block 726). Unit test, static analysis, vetting, compile, and linking 426, vulnerability scans 420, container scans 422 are performed on the master branch (block 728). Once testing completes successfully, the master branch is pushed to the DEV container repository 214 and replaces the current master branch, which automatically triggers a build (block 730). The environment is built for the master branch (block 732) and the master branch is made available to the QA product developers in the QA DNS endpoint 442 (block 734).

In FIG. 8, the UAT stage 500 commences. The developer 402 from the sandbox stage 400 has decided to take all of the features and push them to the UAT stage 500, triggering the UAT build (block 802). The development master image is pulled from the DEV container repository 214 (block 804) and pushed to the UAT image repository 216 (block 806). A build is automatically triggered, using the container orchestration system 106 and the service file 104 (block 808). Once the push is completed, the UAT environment is built/updated with the latest image, the changes can be verified against UAT, which mimics production closely.

The UAT DNS endpoint 514, distinct from the DNS endpoints in the sandbox stage 400, is created, allowing the QA product developers 502 access to the master branch (810). Rigorous testing has already occurred at the sandbox stage and no new feature branches are being built. Nevertheless, the QA product developers 502 may run the master branch in its environment (block 812). Additional performance tests may be executed to validate that the application program 122 is meeting the desired specifications and also properly scales in and out based on load (block 814). Further, the failure tolerance tool 120, such as Chaos Monkey™, may optionally be invoked (block 816).

In FIG. 9, the production stage 600 commences, with the production developer 602 triggering the production build (block 902). The validated production image (of the master branch) is pulled from the UAT image repository 216 (block 904) and pushed to the production image repository 218 (block 906). An environment build is automatically triggered by the container orchestration system 106 using the service file 104 (block 908). The production DNS endpoint 614 is created for the validated image (block 910). The QA product developers, customers, and stakeholders 604 having access to the production DNS endpoint 614 (block 912) and are able to conduct final tests. The operations of the FBDP system 100 are thus complete.

FIG. 10 illustrates an embodiment of an exemplary computing architecture 1000 comprising a computing system 1002 that may be suitable for implementing various embodiments as previously described. In various embodiments, the computing architecture 1000 may comprise or be implemented as part of an electronic device. In some embodiments, the computing architecture 1000 may be representative, for example, of a system that implements one or more components of the system 100, apparatus 200, and method 300 for feature-based deployment pipelines. In some embodiments, computing system 1002 may be representative, for example, of the apparatus 200 for feature-based deployment pipelines. The embodiments are not limited in this context. More generally, the computing architecture 1000 is configured to implement all logic, applications, systems, methods, apparatuses, and functionality described herein.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 1002 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 1002.

As shown in FIG. 10, the computing system 1002 comprises a processor 1004, a system memory 1006 and a system bus 1008. The processor 1004 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 1004.

The system bus 1008 provides an interface for system components including, but not limited to, the system memory 1006 to the processor 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1006 is not a propagating signal divorced from the underlying hardware of the computing system 1002 and is thus non-transitory. The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computing system 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies. The computing system 1002 is generally is configured to implement all logic, systems, methods, apparatuses, and functionality described herein with reference to FIGS. 1-9.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 may include, for example, the various applications and/or components of the feature-based deployment pipeline system 100.

A user can enter commands and information into the computing system 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computing system 1002. In addition to the monitor 1044, a computer typically includes other peripheral output devices, such as speakers, printers, and so forth.

The computing system 1002 may operate in a networked environment using logical connections via wire and/or wireless communications to one or more remote computers, such as a remote computer 1048. The remote computer 1048 may, for example, store the UAT image repository 216 and the production image repository 218, while the solution codebase 102 resides on the computing system 1002. The remote computer 1048 can be a workstation, a server computer, a router, a personal computer, portable computer, microprocessor-based entertainment appliance, a peer device or other common network node, and typically includes many or all of the elements described relative to the computing system 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computing system 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computing system 1002 can include a modem 1058, or is connected to a communications server on the WAN 1054 or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computing system 1002, or portions thereof, can be stored in the remote memory/storage device 1050. It will be appreciated that the network connections shown are exemplary and other means of establishing a communications link between the computers can be used.

The computing system 1002 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operation in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
   launching a project repository for testing an application program, the project repository comprising a plurality of manifest files, each manifest file to be associated with a respective program, wherein the application program is based on a plurality of feature branches;
   receiving a first container image of a first feature branch of the plurality of feature branches from a development container repository, wherein the first container image is for a first version of a plurality of versions of the first feature branch;
   receiving input modifying a source code the first feature branch;
   testing the modified source code of the first feature branch;
   storing, in the development container repository, a second container image of the first feature branch based on the modified source code of the first feature branch, wherein the second container image is for a second version of the plurality of versions of the first feature branch, the second version of the first feature branch based on the modified source code of the first feature branch, wherein storing the second container image triggers a container orchestration system to build a first domain name server (DNS) endpoint for storing the second version of the first feature branch; and
   merging the second version of the first feature branch into a master branch for the application program once testing of the second version of the feature branch is complete, wherein the merging loads the master branch including the second version of the first feature branch to a second DNS endpoint for the master branch.

2. The method of claim 1, wherein merging the second version of the first feature branch is based on the second container image of the first feature branch.

3. The method of claim 1, the container orchestration system to utilize a first manifest file of the plurality of manifest files.

4. The method of claim 1, further comprising:
   determining a downgrade from the second version of the first feature branch is required;
   receiving the first container image of the first feature branch from the development container repository;
   testing the first version of the first feature branch based on the first container image; and
   merging the first version of the first feature branch into the master branch for the application program once testing of the first version of the first feature branch is complete.

5. The method of claim 4, wherein the first container image is received based on a hash value comprising an image tag for the first container image.

6. The method of claim 4, further comprising:
   merging the first version of the first feature branch into the master branch for the application program once testing of the first version of the feature branch is complete.

7. The method of claim 1, further comprising:
   pulling a master image of the master branch from the development container repository; and
   pushing the master image to a user acceptance testing (UAT) image repository, wherein the push triggers a build by the container orchestration system of the second DNS endpoint.

8. A non-transitory computer-readable storage medium, the computer-readable storage medium including instructions that when executed by a processor, cause the processor to:
   launch a project repository for testing an application program, the project repository comprising a plurality of manifest files, each manifest file to be associated with a respective program, wherein the application program is based on a plurality of feature branches;
   receive a first container image of a first feature branch of the plurality of feature branches from a development container repository, wherein the first container image is for a first version of a plurality of versions of the first feature branch;
   receive input modifying a source code the first feature branch;
   test the modified source code of the first feature branch;
   store, in the development container repository, a second container image of the first feature branch based on the modified source code of the first feature branch, wherein the second container image is for a second version of the plurality of versions of the first feature branch, the second version of the first feature branch based on the modified source code of the first feature branch, wherein the storage of the second container image triggers a container orchestration system to build a first domain name server (DNS) endpoint for storing the second version of the first feature branch; and
   merge the second version of the first feature branch into a master branch for the application program once testing of the second version of the feature branch is complete, wherein the merge loads the master branch including the second version of the first feature branch to a second DNS endpoint for the master branch.

9. The computer-readable storage medium of claim 8, wherein merging the second version of the first feature branch is based on the second container image of the first feature branch.

10. The computer-readable storage medium of claim 8, the container orchestration system to utilize a first manifest file of the plurality of manifest files.

11. The computer-readable storage medium of claim 8, wherein the instructions further cause the processor to:
   determine a downgrade from the second version of the first feature branch is required;
   receive the first container image of the first feature branch from the development container repository;
   test the first version of the first feature branch based on the first container image; and
   merge the first version of the first feature branch into the master branch for the application program once testing of the first version of the first feature branch is complete.

12. The computer-readable storage medium of claim 11, wherein the first container image is received based on a hash value comprising an image tag for the first container image.

13. The computer-readable storage medium of claim 11, wherein the instructions further cause the processor to:
   merge the first version of the first feature branch into the master branch for the application program once testing of the first version of the feature branch is complete.

14. The computer-readable storage medium of claim 8, wherein the instructions further cause the processor to:
   pull a master image of the master branch from the development container repository; and
   push the master image to a user acceptance testing (UAT) image repository, wherein the push triggers a build by the container orchestration system of the second DNS endpoint.

15. A computing apparatus comprising:
   a processor; and
   a memory storing instructions that, when executed by the processor, cause the processor to:
      launch a project repository for testing an application program, the project repository comprising a plurality of manifest files, each manifest file to be associated with a respective program, wherein the application program is based on a plurality of feature branches;
      receive a first container image of a first feature branch of the plurality of feature branches from a development container repository, wherein the first container image is for a first version of a plurality of versions of the first feature branch;
      receive input modifying a source code the first feature branch;
      test the modified source code of the first feature branch;
      store, in the development container repository, a second container image of the first feature branch based on the modified source code of the first feature branch, wherein the second container image is for a second version of the plurality of versions of the first feature branch, the second version of the first feature branch based on the modified source code of the first feature branch, wherein the storage of the second container image triggers a container orchestration system to build a first domain name server (DNS) endpoint for storing the second version of the first feature branch; and
      merge the second version of the first feature branch into a master branch for the application program once testing of the second version of the feature branch is complete, wherein the merge loads the master branch including the second version of the first feature branch to a second DNS endpoint for the master branch.

16. The computing apparatus of claim 15, wherein merging the second version of the first feature branch is based on the second container image of the first feature branch.

17. The computing apparatus of claim 15, the container orchestration system to utilize a first manifest file of the plurality of manifest files.

18. The computing apparatus of claim 15, wherein the instructions further cause the processor to:
   determine a downgrade from the second version of the first feature branch is required;
   receive the first container image of the first feature branch from the development container repository;
   test the first version of the first feature branch based on the first container image; and
   merge the first version of the first feature branch into the master branch for the application program once testing of the first version of the first feature branch is complete.

19. The computing apparatus of claim 18, wherein the first container image is received based on a hash value comprising an image tag for the first container image.

20. The computing apparatus of claim 18, wherein the instructions further cause the processor to:
   merge the first version of the first feature branch into the master branch for the application program once testing of the first version of the feature branch is complete.

* * * * *